Patented June 1, 1948

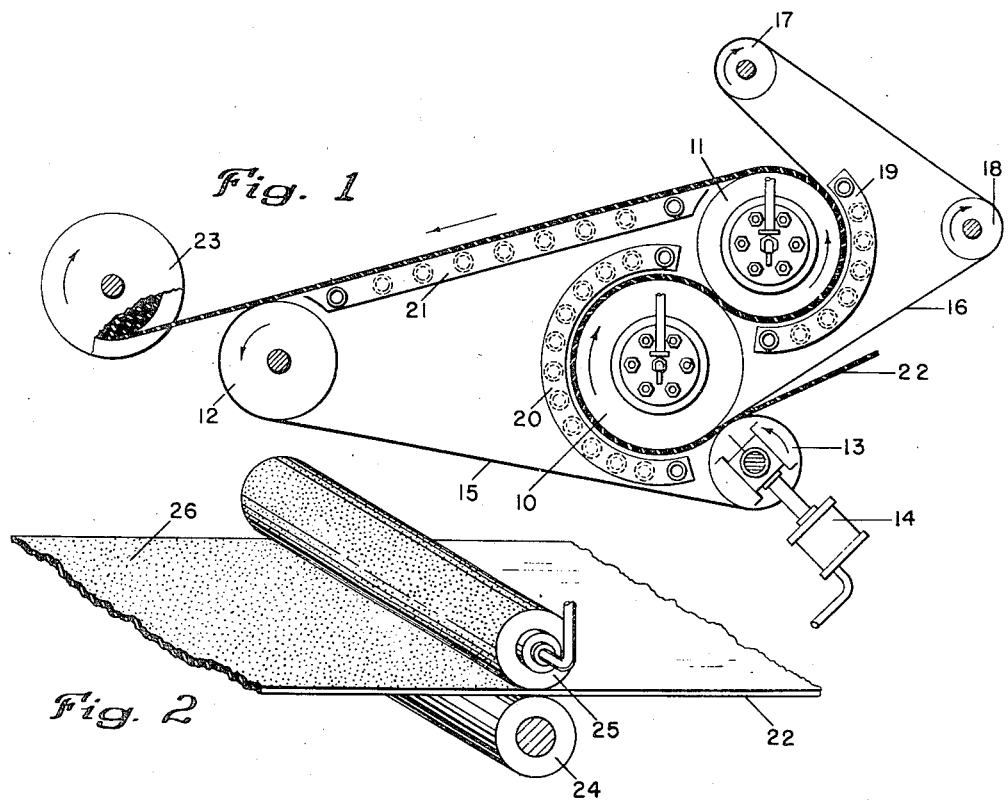
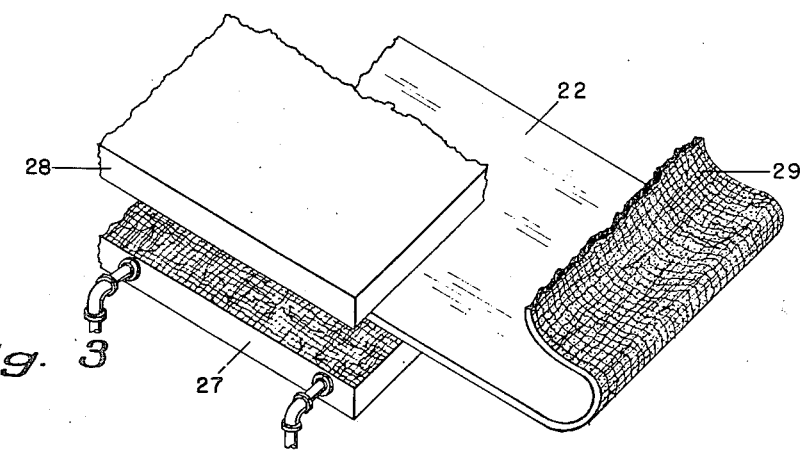

2,442,598

UNITED STATES PATENT OFFICE 2,442,598

PROCESS OF FINISHING PLASTIC SHEET MATERIAL

Arthur Y. Harrison, Arlington Heights, and Edward G. Pinkerton, Dedham, Mass., assignors to Boston Woven Hose and Rubber Company, Cambridge, Mass., a corporation of Massachusetts Application June 25, 1946, Serial No. 679,046

1 Claim. (Cl. 18—56)

This invention comprises a novel process of finishing resinous thermoplastic materials such, for example, as polyvinyl resins or cellulose acetate in sheet form, and includes within its scope the improved product of this new process. An object of the invention is to impart to such plastic sheet material an embossed decorative finish upon a background approximating the texture of leather or paper.

The curing and finishing of sheeted resin material presents many difficulties, due largely to the fact that the material becomes soft and highly adhesive when heated so that it cannot be stripped from heated molding or curing surfaces without being deformed or torn. In the co-pending application of John M. Bierer, Ser. No. 525,029, filed March 4, 1944, and which issued as Patent No. 2,434,541 on January 13, 1948, there is disclosed a process of curing sheeted resin material in accordance with which the material in strip form is heated under pressure between polished steel bands, cooled while still engaged by the bands, and finally stripped in cool condition. The material resulting from this process presents a finish with high gloss that is unsuitable for many uses to which the material might otherwise be put. Heretofore glossy sheets of plastic material have been embossed to present different ornamental surface textures which may approximate natural leather grains, reptile skins, or conventional decorative patterns. This embossing is usually carried out in mechanical presses constructed and arranged to press the gloss-finished sheets against a heated engraved embossing plate so as to impart the negative of the embossed plate surface to the surface of the prepared plastic sheet. Under these circumstances the background of the pattern is still left glossy, and the trade objects to it as artificial looking and because such surfaces feel tacky when pressed together.

We have discovered that the objections above discussed may be obviated in a commercially practicable manner and other advantages secured by introducing an intermediate step effective to convert the gloss finish of cured sheet material to a matte finish. Going more into detail, we propose to prepare the sheet stock in strips of the desired length, width and thickness, and subsequently or at the same time impart to it a gloss finish. The sheets so prepared are then passed between a pair of squeeze rolls, one or both of which have surfaces roughened by sandblasting, Parkerizing, Sheridizing, etching or the like. Passage through these rolls which are heated results in a matte or dull finish on the plastic strip, the degree of dullness depending on the opposing pressure of the squeeze rolls, their diameter, their temperature, the coarseness or fineness of the sandblasting, Parkerizing, etc., the temperature of the strip, and the speed of passage between the rolls. Plastic strips so treated emerge from the rolls with a dull leathery appearance, and this surface finish persists when further processed. Finally the plastic sheets may be embossed to impose a decorative or conventional pattern on the matte finish thereof, with the production of a more valuable and readily salable product than has heretofore been available.

These and other features of the invention will be best understood and appreciated from the following description of a preferred manner of putting into practice the process of our invention, as illustrated in the accompanying drawings, in which:

Fig. 1 is a diagrammatic view of apparatus for producing gloss finished strips of resinous plastic material, Fig. 2 is a view in perspective suggesting the step of passing the strip material between squeeze rolls, and Fig. 3 is a view in perspective suggesting the embossing step of our novel process.

The apparatus shown in Fig. 1 is substantially that more fully described in the patent application of John M. Bierer above identified, and may be employed in carrying out the first step of our process. The apparatus includes in its structure a heated drum 10, a cooled guide roll 11, a tension roll 12 and a combined pressure and guide roll 13. The roll 13 is forced at all times toward the drum 10 by hydraulic mechanism including a cylinder 14 and a piston acting on each journal of the roll.

A steel pressure band 15 passes in an approximately triangular path about substantially 270° of the circumference of the heated drum 10, then about the guide roll 11, forwardly about the tension roll 12, rearwardly and about the pressure and guide roll 13, and back to the drum 10. The band is maintained under heavy pressure upon the drum 10 by hydraulic mechanism (not shown) acting upon the journals of the tension roll 12. A second pressure band 16 passes about guide rolls 17 and 18, the heated drum 10 and the cooled guide roll 11 overlapping the pressure band 15 throughout the heated portion of its path. The band 15 is preferably of polished steel and the band 16 may be of the same or of different material, since it usually engages the unfinished surface of the stock. A segmental cooling jacket 19 is associated with the cooled guide roll 11, and a segmental heater 20 is associated with the heated drum 10. A straight elongated cooling device 21 is arranged in contact with the pressure band 15 as it passes from the roll 11 to the tension roll 12.

As shown in Fig. 1, a single ply 22 of thermoplastic material is advanced to the bight of the bands 15 and 16 between the drum 10 and the pressure roll 13. The stock is advanced under heavy pressure and heated between the two bands while they pass about the circumference of the drum 10, to its point of approximate tangency with the cooling roll 11. The stock is then advanced around the circumference of the cooling roll 11 between the bands and is cooled without being disturbed in its engagement with the bands. After passing beyond the segmental cooler 19 the band 16 is stripped away from the stock which then continues to be advanced upon the band 15 over the straight cooler 21. By the time the stock 22 reaches the tension roll 12 it is cool enough to be stripped from the band 15 and wound in a coil upon a reel 23. While we have shown only a single ply 22 as being presented to the curing drum 10, two or more plies may be delivered to the apparatus if desired and laminated into a single thick sheet, all as disclosed in the application of John M. Bierer above identified. If desired the thermoplastic sheet may have a fabric backing. The pressure band 15 is of polished steel and accordingly imparts to the surface of the stock in contact with it a smooth glossy finish.

The second step of our process consists in passing the gloss finished stock between squeeze rolls in contact with a rough finished heated surface whereby the gloss finish is converted to a matte finish, giving the stock a leathery or paper-like appearance. The stock 22 is shown in Fig. 2 as being passed between the squeeze rollers 24 and 25 with its gloss finished surface uppermost. The roll 25 has a sandblasted or Parkerized finish and may be heated to 250–300° F. by suitable steam connections as suggested in the drawing. On emerging from these squeeze rolls, the gloss finish is shown as having been converted to a uniform matte finish 26.

The final step of our process consists in imposing an embossed finish of different and distinctive character on the matte finished surface of the stock. This step is suggested in Fig. 3 where a pair of cooperating embossing plates 27 and 28 are shown. The plate 27 has steam connections whereby it may be heated and its face is etched or engraved to present an ornamental pattern such as that presented by a grain surface of leather. The stock is presented in position between the embossing plates 27 with its matte finished surface in contact with the engraved plate 27 and then subjected to heat and pressure. The result of this final embossing step is to mold into the sheet the ornamental surface finish indicated by reference character 29. It will be of course understood that any other desired pattern may be formed by suitable modification of the surface of the engraved plate 27.

Having thus disclosed our invention, we claim as new and desire to secure by Letters Patent:

The process of finishing and imparting an ornamental finish to plastic resinous material in sheet form which includes the steps of progressively subjecting the sheet to heat and pressure between smooth heated surfaces of a pair of endless steel bands and producing a glossy surface thereon, cooling the sheet while maintaining the same under the pressure of the endless bands, stripping the sheet from one of the bands and further cooling the sheet while the same is supported by the other band, stripping the sheet from the second mentioned band, winding the cooled gloss-surface sheet about a reel, thereafter subjecting the sheet material to heat and pressure by passing the sheet between a roughened heated roll and a pressure roll with the gloss-surface in contact with the roughened roll thereby converting the gloss surface to a leather-like surface, and finally subjecting the sheet to heat and pressure between a heated embossing plate and a pressure plate with the leather-like surface of the sheet in contact with the embossing plate, thus molding a new and different contour upon the sheet and producing a decorative pattern with a background of leather-like surface.

ARTHUR Y. HARRISON.
EDWARD G. PINKERTON.

REFERENCES CITED

The following references are of record in the file of this patent:

UNITED STATES PATENTS

| Number | Name | Date |
|---|---|---|
| 369,147 | Wood | Aug. 30, 1887 |
| 1,751,546 | Glidden et al. | Mar. 25, 1930 |
| 2,318,111 | Steinberger | May 4, 1943 |
| 2,321,047 | Salzberg | June 8, 1943 |